(12) United States Patent
Alesi et al.

(10) Patent No.: US 7,614,491 B2
(45) Date of Patent: Nov. 10, 2009

(54) METHOD AND APPARATUS FOR THE CONTROLLED TRANSFER OF UNIT LOADS

(75) Inventors: Peter Alesi, Zirndorf (DE); Torsten Tanz, Hilzingen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/288,103

(22) Filed: Oct. 16, 2008

(65) Prior Publication Data

US 2009/0101477 A1    Apr. 23, 2009

(30) Foreign Application Priority Data

Oct. 17, 2007    (DE) .................... 10 2007 049 780

(51) Int. Cl.
*B65G 47/53* (2006.01)
(52) U.S. Cl. ............... 198/418.6; 198/407; 198/370.12; 198/689.1; 198/592; 198/598
(58) Field of Classification Search ............. 198/584, 198/586, 587, 592, 598, 689.1, 811, 418.6, 198/407, 370.12
See application file for complete search history.

(56) References Cited

U.S. PATENT DOCUMENTS

| | | | | |
|---|---|---|---|---|
| 4,684,008 A | * | 8/1987 | Hayashi et al. ............. | 198/436 |
| 4,780,041 A | * | 10/1988 | Ashby, Jr. .................... | 414/398 |
| 5,038,918 A | * | 8/1991 | McRae ........................ | 198/586 |
| 5,284,003 A | * | 2/1994 | Goodman et al. ............. | 53/437 |
| 5,439,096 A | * | 8/1995 | Shigematsu et al. ......... | 198/606 |
| 5,746,303 A | * | 5/1998 | Niewold ...................... | 198/660 |
| 6,283,694 B1 | * | 9/2001 | Spatafora et al. ....... | 414/416.05 |
| 7,182,334 B2 | * | 2/2007 | Spence et al. ................ | 271/197 |
| 7,207,558 B2 | * | 4/2007 | Edinger ....................... | 271/197 |
| 7,467,703 B2 | * | 12/2008 | Furthmuller et al. ...... | 198/419.2 |

FOREIGN PATENT DOCUMENTS

| | | |
|---|---|---|
| DE | 40 40 231 A1 | 6/1992 |
| DE | 103 46 122 A1 | 4/2005 |
| DE | 697 34 891 T2 | 7/2006 |

\* cited by examiner

*Primary Examiner*—Douglas A Hess

(57) ABSTRACT

The invention relates to a method and to an apparatus for the controlled transfer of unit loads from a first conveyor onto a second conveyor which is partially projected over by the first conveyor, the transport directions of which conveyors run at an angle with respect to each other. In order to permit controlled transfer of the unit loads in a defined position from the first conveyor onto the second conveyor, it is proposed that a negative pressure which acts on the upper side of the conveyor belt of the second conveyor can be generated below the first conveyor in the transfer region onto the second conveyor.

8 Claims, 2 Drawing Sheets

METHOD AND APPARATUS FOR THE CONTROLLED TRANSFER OF UNIT LOADS

CROSS REFERENCE TO RELATED APPLICATIONS

This application claims priority of German application No. 10 2007 049 780.8 filed Oct. 17, 2007, which is incorporated by reference herein in its entirety.

FIELD OF THE INVENTION

The invention relates to a method and to an apparatus for the controlled transfer of unit loads from a first conveyor onto a second conveyor which is partially projected over by the first conveyor, the transport directions of which conveyors run at an angle with respect to each other, in particular from the transfer band of a feed conveyor onto the supply and/or acceleration band upstream of a cross-belt or tilting-tray sorter.

BACKGROUND OF THE INVENTION

During the transfer of unit loads from one conveyor onto a second conveyor arranged at an angle with respect thereto, it is frequently necessary to ensure that the orientation of the unit load on both conveyors corresponds to certain criteria, for example that the unit load is not displaced or rotated on the second conveyor. This is particularly important if the second conveyor is a supply and/or acceleration band upstream of a cross-belt or tilting-tray sorter. As is known, cross-belt or tilting-tray sorters comprise individual, interconnected conveyor elements which are connected to one another to form a train or an endless belt and on which a respective unit load is transported. For the positionally correct transfer of the unit load parts onto the sorter elements, it has to be ensured that the unit load is transferred in a manner matched to the supporting surface of the sorter elements. This can be brought about in the simplest manner if the unit load coming from the transfer band of the feed conveyor already rests on the supply band in a defined manner.

Conveyors of the type described at the beginning are customarily arranged in such a manner that their transport directions run at an obtuse angle with respect to one another. In addition, the conveying speeds of the conveyors involved are coordinated with one another; the unit loads retain their predetermined orientation on the supply band during the transfer, and the transfer angle between supply band and cross-belt or tilting-tray sorter is selected accordingly. Generally, an acute angle is enclosed between the supply band and the cross-belt or tilting-tray sorter.

Known feed conveyors of the type in question have a transfer band which is kept very flat and projects at least in a subregion over the conveyor belt of the second conveyor. Both conveyors are operated at the same speed or at a speed which increases in the conveying direction. However, it has been shown that, as a consequence of the transporting movement of the conveyors, air turbulence which has the effect of an air cushion is produced directly above the surface of the second conveyor. This leads to letters having a low weight and large area, for example DIN A4 envelopes, when "shooting" from the transfer band onto the conveyor belt of the second conveyor, being carried away by the air cushion and landing at undefined locations, which understandably has negative consequences with regard to the further transportation. Since the unit load which comes to lie on the belt band in an undefined manner cannot be transferred to the sorter in the required orientation, disturbances are unavoidable.

The problem is intensified by the fact that the transfer band and the belt conveyor are arranged at an angle with respect to each other. On account of the abrupt change in direction during shooting of the unit load onto the conveyor belt of the second conveyor, the unit load is offset and/or rotated by means of the pulse, which is associated with the change in direction, on the air cushion described. Even in the case of relatively large unit load parts, this leads to an imprecise transfer onto the cross-belt or tilting-tray sorter, and therefore the operational capacity and the availability of the system are impaired.

DE 103 46 122 A1 describes a transfer apparatus for a sorter of the type in question, in which the unit load is deposited at the end of the transfer band of a feed conveyor onto a movable table which adjoins it in the conveying direction and which is displaced together with the unit load resting on it by the belt of the supply band. So that the unit load does not slip from the table during the movement of the table and the acceleration and braking phases required therefor, it is held on the table by means of a vacuum generated therein and is not ejected until at the discharge point by the negative pressure being cancelled and by abrupt movement back of the table. However, this solution does not prevent the problem outlined at the beginning of an air cushion forming on the conveyor belt, although the shooting in of the unit load and the change in direction which arises at the same time are less significant in this solution. Nevertheless, the known solution is highly complicated and, because of the many mechanical parts, is susceptible to faults and is expensive.

SUMMARY OF THE INVENTION

The present invention addresses the problem of improving an apparatus and a method for the controlled transfer of unit loads from a first conveyor onto a second conveyor of the type in question in such a manner that the production of an air cushion on the surface of the second conveyor due to turbulence is avoided and therefore a controlled transfer of the unit loads in a defined position onto the second conveyor is made possible.

To solve the problem, it is proposed according to the invention that a negative pressure which is effective on the upper side of the conveyor belt of the second conveyor can be generated below the first conveyor in the transfer region onto the second conveyor. The present invention is based on the knowledge that the turbulence on the surface of the second conveyor belt causes the unit load to be inadvertently carried away or rotated on the belt band. This can be prevented by the negative pressure which is generated on the upper side of the conveyor belt and in which the air cushion is as it were sucked off.

In a refinement of the invention, it is proposed that the negative pressure can be generated in at least one subsection of the second conveyor by sucking the air through a perforated conveyor belt. By placing holes in the belt of the second conveyor, it is possible to suck off the air downwards through the conveyor belt and therefore to prevent the formation of the damaging air cushion or to destroy an arising air cushion. The unit load therefore drops directly onto the surface of the conveyor belt without being displaced or carried away in an uncontrolled manner by an air cushion.

An apparatus for sucking the air through the perforated conveyor belt is preferably arranged below the upper strand of the second conveyor in the transfer region of the unit load. This apparatus may comprise, for example, a tube which is connected to a suction pump or a ventilator generating the negative pressure.

In one refinement, it is proposed that the perforated conveyor belt is guided with the lower side of its upper strand over a table or grate through which the air can be sucked off. Said table or grate firstly permits a secure supporting surface, even for relatively heavy unit loads, and nevertheless enables the air to be sucked off downwards from the upper side of the belt through the belt.

A method for the controlled transfer of unit loads from a first conveyor onto a second conveyor which is partially projected over by the first conveyor is characterized in that an air cushion which is produced on the belt surface, in particular on the supporting surface for the unit load on the second conveyor, during the operation of the conveyors is removed by the air being sucked off downwards through the belt.

On account of the simple design, the present invention is highly reliable and guarantees an undisturbed, high operational capacity. The functional and system reliability arise through the more precise transfer of the unit load from the first onto the second conveyor, for example from a transfer band onto the belt conveyor arranged upstream of a sorter. The higher operational capacity of the system arises from the fact that the number of acceleration bands which are part of a sorter entry point can be reduced; this is because there has to be fewer readjustments if the quality of the transfer of the unit load can be improved.

BRIEF DESCRIPTION OF THE DRAWINGS

An exemplary embodiment of the invention is illustrated in the drawing and is described below.

DETAILED DESCRIPTION OF THE INVENTION

Figure 1:
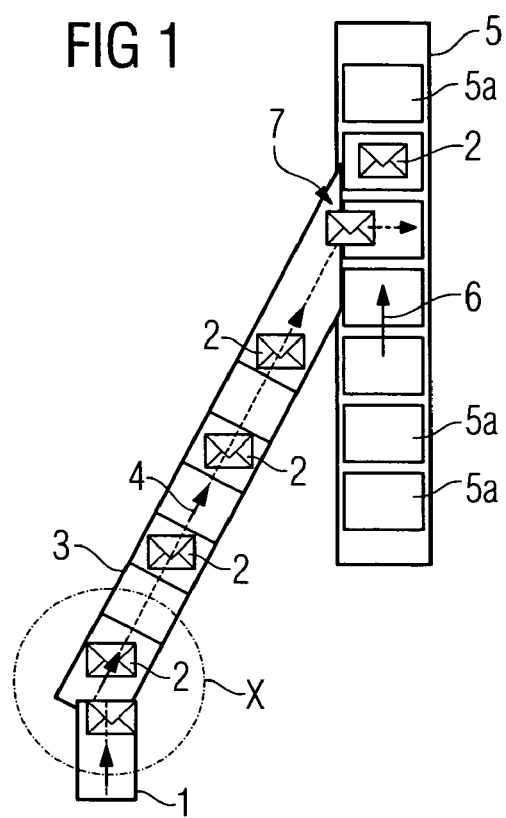
FIG. 1 shows, in a top view and roughly schematically, an arrangement according to the invention of a supply band between a feed conveyor and a sorting conveyor.

FIG. 1 illustrates, in a top view and roughly schematically, the arrangement of the individual conveyors with respect to one another. The reference number 1 denotes the feed conveyor from which a unit load part 2 is transferred onto a supply band 3 which is arranged at an obtuse angle with respect to the feed conveyor 1. The supply band 3 transports the unit loads 2 in the arrow direction 4, in an unchanged orientation from the feed conveyor, to a cross-belt conveyor 5 which is arranged at an acute angle with respect to the supply band. As is known per se, a cross-belt conveyor comprises a multiplicity of individual carriage-like sorter elements 5a which, coupled to one another to form a closed or train-like chain of carriages, revolve on a closed track, with the individual sorter elements 5a each bearing a conveyor belt which revolves transversely with respect to the transport direction 6 of the cross-belt conveyor 5 and on which the unit load rests and which can be driven transversely with respect to the transport direction 6 in order to pick up and dispense the unit load. In order to be able to feed the unit load, as shown at 7, onto the cross belt of the cross-belt conveyor in a correct position, it is necessary for the unit load 2 to be deposited on the supply band 3 in a predefined orientation because then only a small degree of orienting, if any at all, is required during or before the transfer onto the cross-belt conveyor. For this reason, it is necessary for the unit load 2 arriving on the transfer band 8 (FIG. 2) of the feed conveyor 1 to be transported thereto in an orientation which substantially corresponds to the subsequent orientation on the cross-belt conveyor 5.

Figure 2:
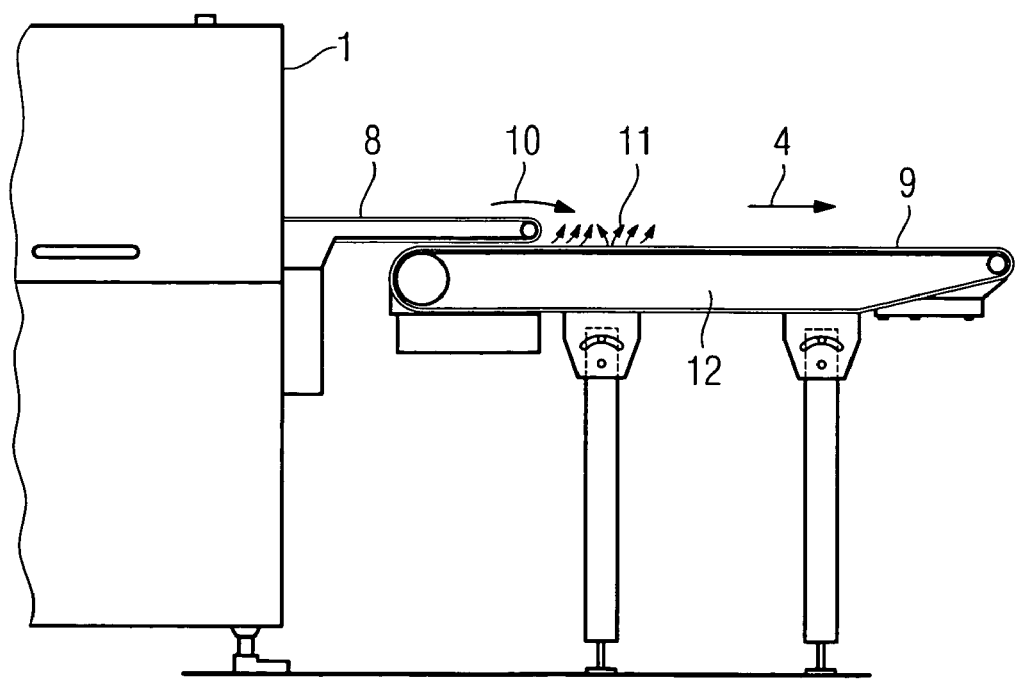
FIG. 2 shows the feed conveyor and the supply band in a side view.

FIG. 2 illustrates, in side view, part of the transfer region, which is identified by X in FIG. 1, for transferring the unit load 2 from the feed conveyor 1 onto the supply band 3. The transfer band 8 of the feed conveyor 1 projects, as illustrated, over a subregion of the supply band 3 which is guided and driven around deflecting rollers in the arrow direction 4. A unit load part 2 which rests on the transfer band 8 is "shot" onto the supply band 3 in the arrow direction 10 and is transported further there in the arrow direction 4 to the cross-belt conveyor 5.

It has been shown that, as a consequence of the supply band 3 revolving at the transporting speed and also because of the revolving transfer band 8, air turbulence arises on the belt 9 of the supply band 3, said turbulence leading to the formation of a type of air cushion 11. If a unit load part 2 passes onto said air cushion, the air cushion can cause the unit load part 2 to be carried in an uncontrolled manner by the same and at the same time to be inadvertently rotated or laterally displaced.

Figure 3:
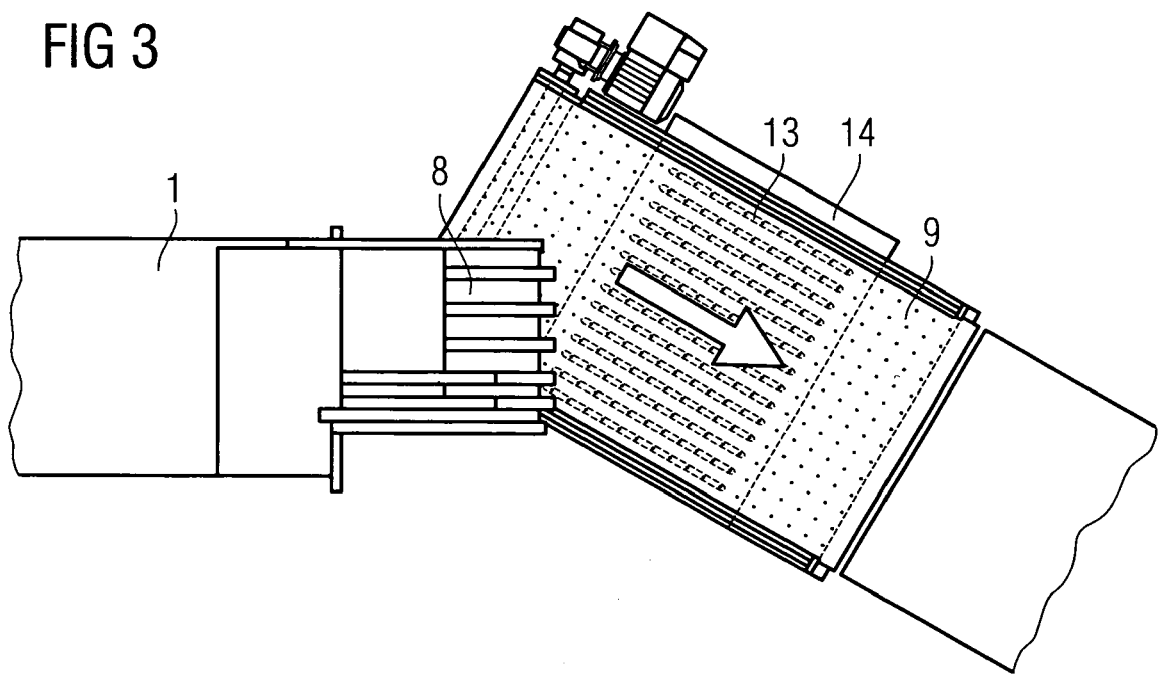
FIG. 3 shows a top view of the transfer region between the feed conveyor and supply band.

In order to prevent this, a suction is set up in the supporting frame 12 of the supply band 3, with the aid of which suction the air is sucked downwards through the conveyor belt 9 of the supply band 3. For this purpose, as illustrated in FIG. 3, the conveyor belt 9 of the supply band 3 is perforated, preferably provided with through holes through which the air can penetrate. At least in the region of the transfer between the transfer band 8 and the supply band 3, a suction box is illustrated schematically below the upper strand of the supply band 3 at 13, in which suction box a negative pressure is generated by means of a pump (not illustrated), the negative pressure preventing, by means of suction of the air, the air cushion which should be avoided from forming above it on the conveyor belt 9. This simple measure ensures that a unit load coming from the transfer band 8 and shot onto the supply band 3 is ejected onto the conveyor belt 9 of the supply band 3 in the designated position without it being able to get onto an air cushion causing inadvertent lateral movements or rotations.

As can be seen in FIG. 3, only the first subsection of the supply band 3 is provided with the perforated conveyor belt 9 and the suction device 13; conveyor sections leading on further are equipped with conventionally closed belts.

The invention claimed is:

1. An apparatus for controlling a transfer of a unit load, comprising:
a first conveyor having a transfer band from which the unit load is transferred at a predetermined orientation;
a second conveyor onto which the oriented unit load is to be transferred; and
a conveyor belt of the second conveyor,
wherein the second conveyor is configured to be partially projected over by the transfer band of the first conveyor and have a transport direction at an angle obtuse with respect to a transport direction of the first conveyor, and
wherein a negative pressure acting on an upper side of the conveyor belt of the second conveyor is generated below the transfer band of the first conveyor only in a transfer region onto the second conveyor such that the second conveyor receives the oriented unit load at the predetermined orientation preserved from the first conveyor via the negative pressure acting on an upper side of the conveyor belt of the second conveyor, and
wherein the conveyor belt of the second conveyor is arranged at an acute angle with respect and upstream to a cross belt or a tilting tray sorter such that the cross belt or tilting tray sorter receives the oriented unit load at the predetermined orientation preserved from the first conveyor.

2. The apparatus as claimed in claim 1, wherein the conveyor belt is a perforated conveyor belt.

3. The apparatus as claimed in claim 1, wherein the negative pressure is generated only in the transfer region by sucking an air through the perforated conveyor belt.

4. The apparatus as claimed in claim 3, wherein a device for sucking the air through the perforated conveyor belt is arranged below an upper strand of the second conveyor in the transfer region.

5. The apparatus as claimed in claim 3, wherein the perforated conveyor belt is guided with a lower side of the upper strand over a table or grate through which the air is sucked off.

6. The apparatus as claimed in claim 1, wherein the second conveyor is a supply band.

7. A method for controlling a transfer of a unit load from a first conveyor onto a second conveyor partially projected over by the first conveyor, comprising:

arranging a transfer band of the first conveyor and the second conveyor in a transfer region at an obtuse angle with respect to each other;

orienting a unit load on the first conveyor with a predetermined orientation with respect to a conveying direction of the first conveyor;

arranging a cross belt sorter or a tilting tray sorter at an acute angle with respect to the second conveyor;

producing an air cushion on a belt surface of a conveyor belt in the transfer region;

removing the air cushion by sucking off an air downwards through the conveyor belt of the second conveyor only in the transfer region during operating the first and the second conveyors;

transferring the unit load from the first to the second conveyor while preserving the predetermined orientation of the unit load via the removed air cushion; and transferring the oriented unit load to the cross belt sorter or a tilting tray sorter while preserving the predetermined orientation of the unit load.

8. The method as claimed in claim 7, wherein the air cushion is produced on a supporting surface of the second conveyor for the unit load.

* * * * *